United States Patent [19]

Clore et al.

[11] 4,407,498

[45] Oct. 4, 1983

[54] LOCK FOR A FLEXIBLE ELEMENT

[75] Inventors: Wayne G. Clore; Charles T. Norton; William P. Thompson, all of Anderson, Ind.

[73] Assignee: Recreation Equipment Corp., Anderson, Ind.

[21] Appl. No.: 817,332

[22] Filed: Jul. 20, 1977

[51] Int. Cl.³ .................... A63B 63/08; B60T 7/12; F16D 59/02

[52] U.S. Cl. .................... 273/1.5 R; 187/71; 187/89; 188/65.1; 188/188; 188/189; 297/478

[58] Field of Search .................... 273/1.5 R, 1.5 A; 187/71, 89; 297/388, 385, 475, 478, 479; 73/548; 242/107.2, 107.3, 107.4; 188/65.1–65.5, 188, 189

[56] References Cited

U.S. PATENT DOCUMENTS

| 1,165,583 | 12/1915 | Farmer | 188/188 X |
| 2,939,550 | 6/1960 | Puttre | 188/65.1 |
| 3,968,865 | 7/1976 | McElroy | 188/188 |
| 3,984,083 | 10/1976 | McElroy | 188/188 X |

Primary Examiner—Paul E. Shapiro
Attorney, Agent, or Firm—Barnes & Thornburg

[57] ABSTRACT

An inertial lock for a safety belt includes a frame supporting a fixed locking jaw and a movable locking jaw. The belt passes between the jaws. A spring yieldably urges the movable jaw into gripping orientation with respect to the fixed jaw to prevent movement of the belt between the jaws. The belt is trained about a wheel supported in the frame such that movement of the belt rotates the wheel. A shaft extends radially outwardly from the axis of the wheel, and a weight is reciprocably disposed on the shaft. A spring biases the weight away from the distal end of the shaft toward the rotational axis of the wheel. Centrifugal force on the weight caused by rotation of the wheel urges the weight against the spring. Wheel rotation rates in excess of a predetermined rate displace the weight radially outwardly along the shaft. The weight includes a mechanism for triggering the movable jaw to move in response to its spring into gripping orientation with the fixed jaw. In the illustrated embodiments, the apparatus further includes a self-winding spool for storing the belt. The spool includes a clock-spring. Removal of the belt from the spool winds the clock-spring so that tension is always maintained on the belt when it is off the spool.

1 Claim, 4 Drawing Figures

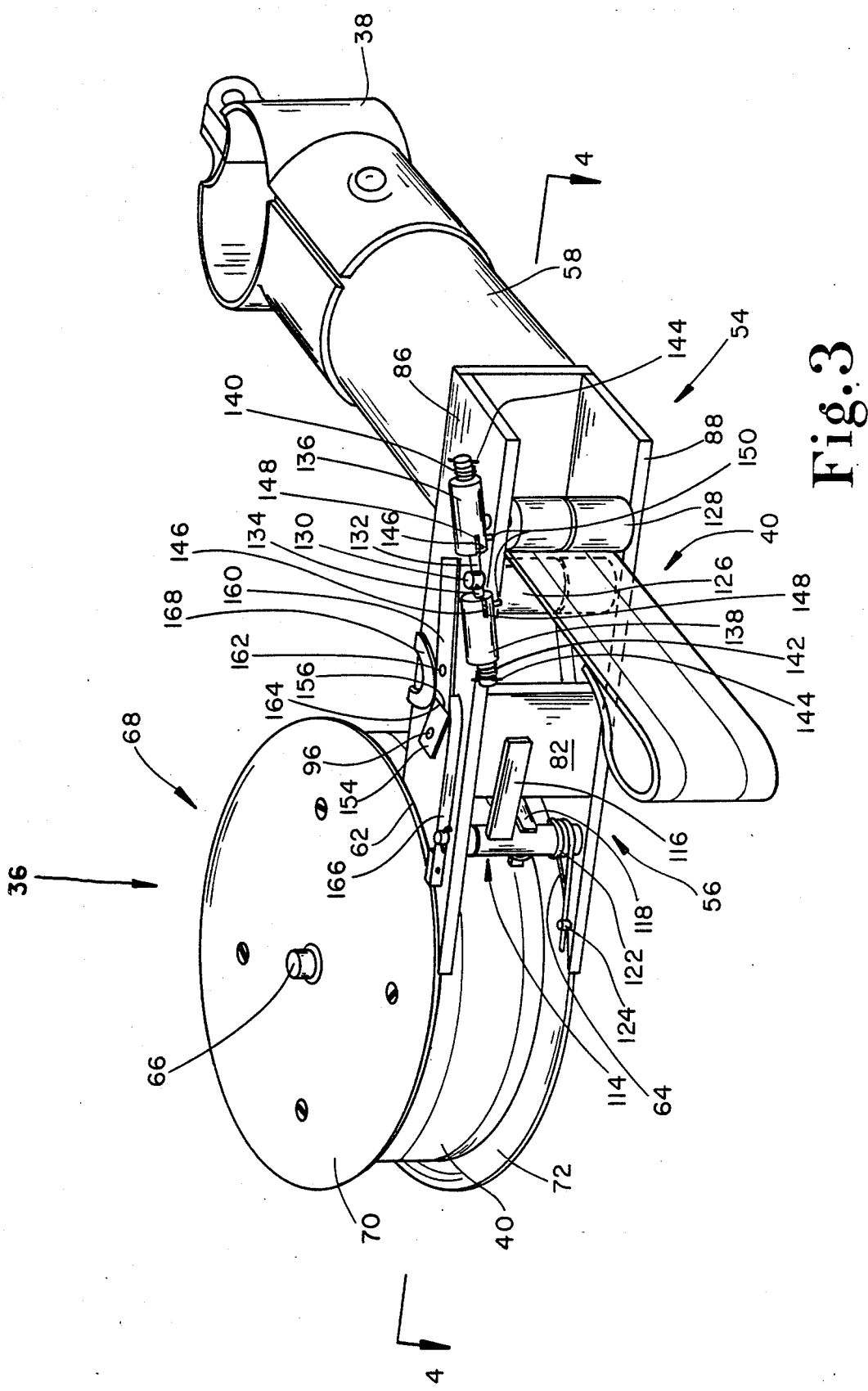

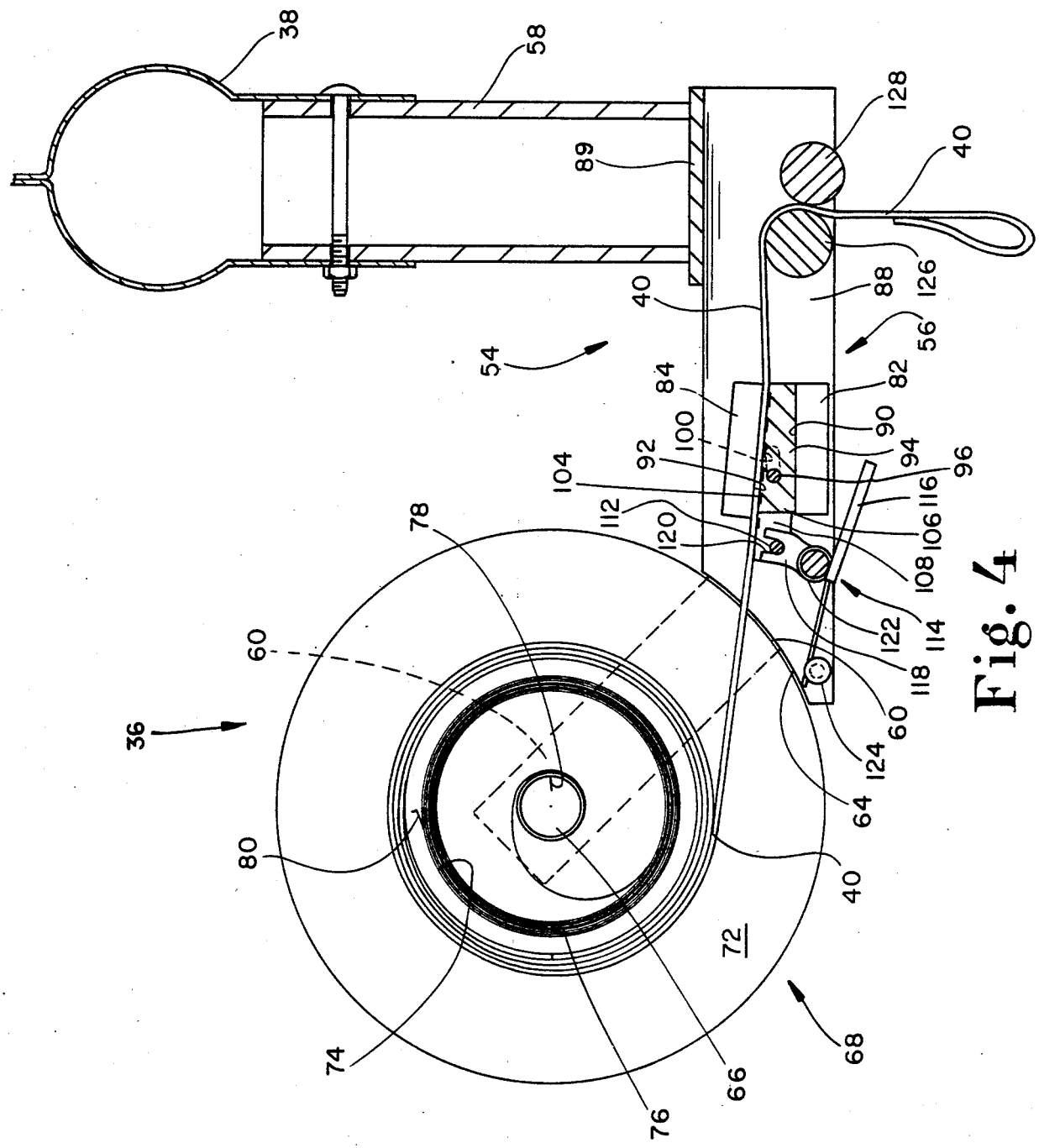

LOCK FOR A FLEXIBLE ELEMENT

This invention relates to lock mechanisms for flexible elements, and particularly to a centrifugal force-sensitive lock mechanism for flexible elements.

Lock mechanisms for flexible elements have found considerable applicability in various fields, for example, in automobile safety seat belt inertial locks. Such devices are useful in many other fields, however. For example, such lock mechanisms can be used to prevent damage, injury and other mishaps in the event of a malfunction in downwardly-swinging basketball backstops. Basketball backstops are frequently used in gymnasiums and assembly halls in which basketball games are conducted, but which are also used for other purposes. It is often desirable to move the basketball backstops to positions offering an unobstructed view of some activity, such as a musical performance, speech or play occurring in an area of the gymnasium or assembly hall. For such activities, it is desirable to use the same seating as is used when the gymnasium or assembly hall is used to conduct basketball games. To leave the basketball backstops in their use positions would result in an obstructed view of the non-basketball activities for many patrons. Thus, the basketball backstops are, in many modern gymnasiums and assembly halls, mounted from the ceiling to swing between their use positions and hoisted or stored positions adjacent the ceiling or in some other non-obstructing orientation. Apparatus for permitting folding of such basketball backstops is of various types which can generally be classified in three categories: forward-folding; backward-folding; and, side-folding. An inertial lock is useful in conjunction with such devices to prevent them from unfolding as a result of hoisting cable- or winch-failure. Such inadvertent unfolding can cause damage to the backstop supporting structure, to the ceiling from which such structure is suspended, and, most importantly, injury to persons situated in the path of the unfolding apparatus.

In accordance with the invention, an inertial lock for a flexible element comprises a frame providing a surface, and a movable locking jaw. The movable locking jaw is supported for movement in the frame between a position out of locking orientation with the surface and a position in locking orientation with the surface. The flexible element passes between the surface and the movable locking jaw. Means are provided for yieldably urging the movable jaw into locking orientation with the surface to prevent movement of the flexible element between the surface and the jaw. Means are provided for holding the movable jaw out of locking orientation with the surface against the urging of the yieldable urging means. Means are also provided which are responsive to rates of movement of the flexible element in excess of a predetermined rate for releasing the holding means to allow the movable jaw to move into locking orientation with respect to the surface and prevent further movement of the flexible element therebetween. The releasing means includes means disposed for rotation in response to movement of the flexible element, the rotating means being supported for rotation in the frame. The actuating means further includes means mounted on the rotating means and responsive to rotation thereof to cause the holding means to release the movable jaw.

According to the illustrated embodiment of the invention, the apparatus further includes a spool for storing a length of the flexible element, the spool being rotatably suppported on the frame, and spring means for exerting a rewinding force on the spool, the spring means being wound by rotation of the spool as the flexible element is withdrawn therefrom to maintain tension on the flexible element.

Further according to the illustrated embodiment, the holding means comprises a resettable trigger and the yieldable urging means comprises a spring for exerting a shifting force on the movable jaw sufficient to move it into locking orientation with respect to the surface.

According to the illustrated embodiment, the means disposed for rotation in response to movement of the flexible element includes a drive wheel supported adjacent the path of the flexible element, movement of the flexible element causing rotation of the wheel. Additionally, an idler wheel is rotatably supported in the frame adjacent the driven wheel, the idler wheel holding the flexible element against the drive wheel.

Additionally according to the illustrated embodiment, the means mounted on the rotating means includes a shaft extending generally radially outwardly from the rotational axis of the wheel, a weight reciprocably mounted on the shaft, and means for urging the weight radially inwardly along the shaft. Centrifugal force on the weight due to spinning of the shaft about the wheel axis causes the weight to be urged outwardly against the urging means along the shaft. Means are mounted on the weight for moving the holding means to a released position. The means for urging the weight radially inwardly comprises a spring on the shaft intermediate the weight and the radially outer end of the shaft.

The invention may best be understood by referring to the following description and accompanying drawings. In the drawings:

FIG. 3 is a bottom perspective view of the apparatus of the instant invention; and, FIG. 4 is a sectional side elevational view of the apparatus taken generally along section lines 4—4 of FIG. 3.

Figure 1:
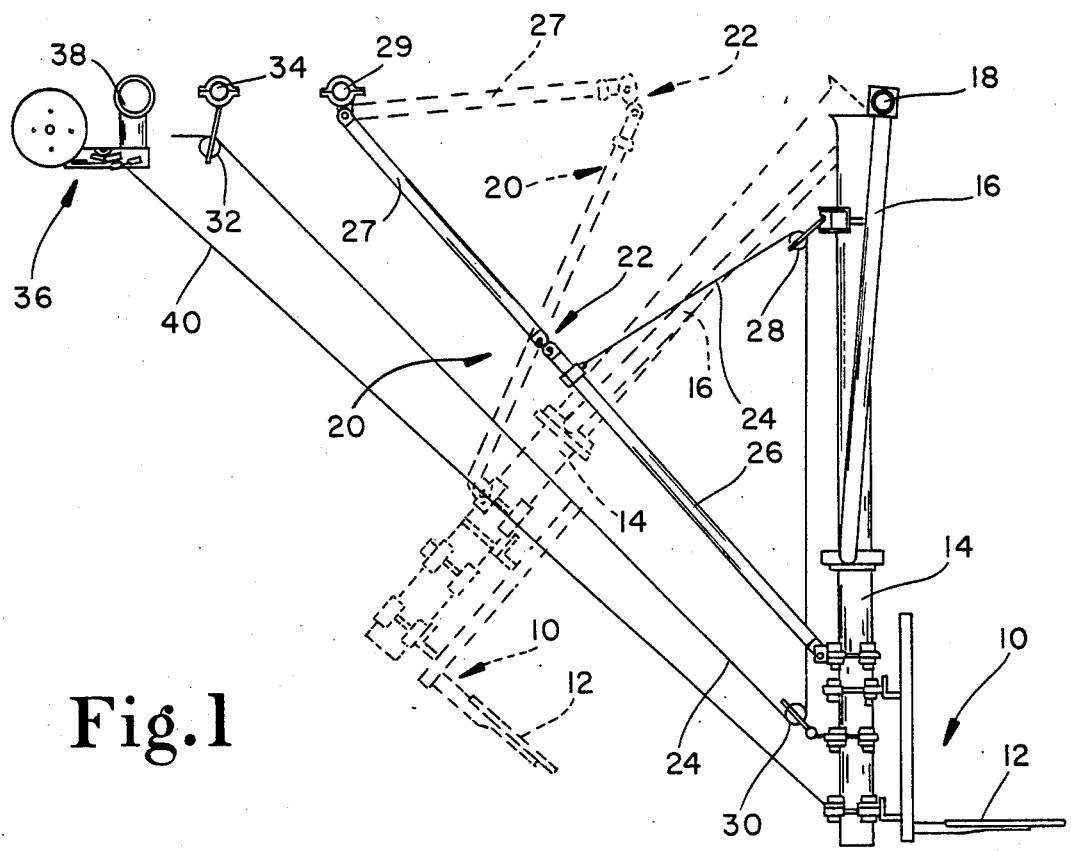
FIG. 1 illustrates a backward-folding backstop mechanism including the apparatus of the instant invention, a position of the backstop during folding thereof being illustrated in broken lines.
Figure 2:
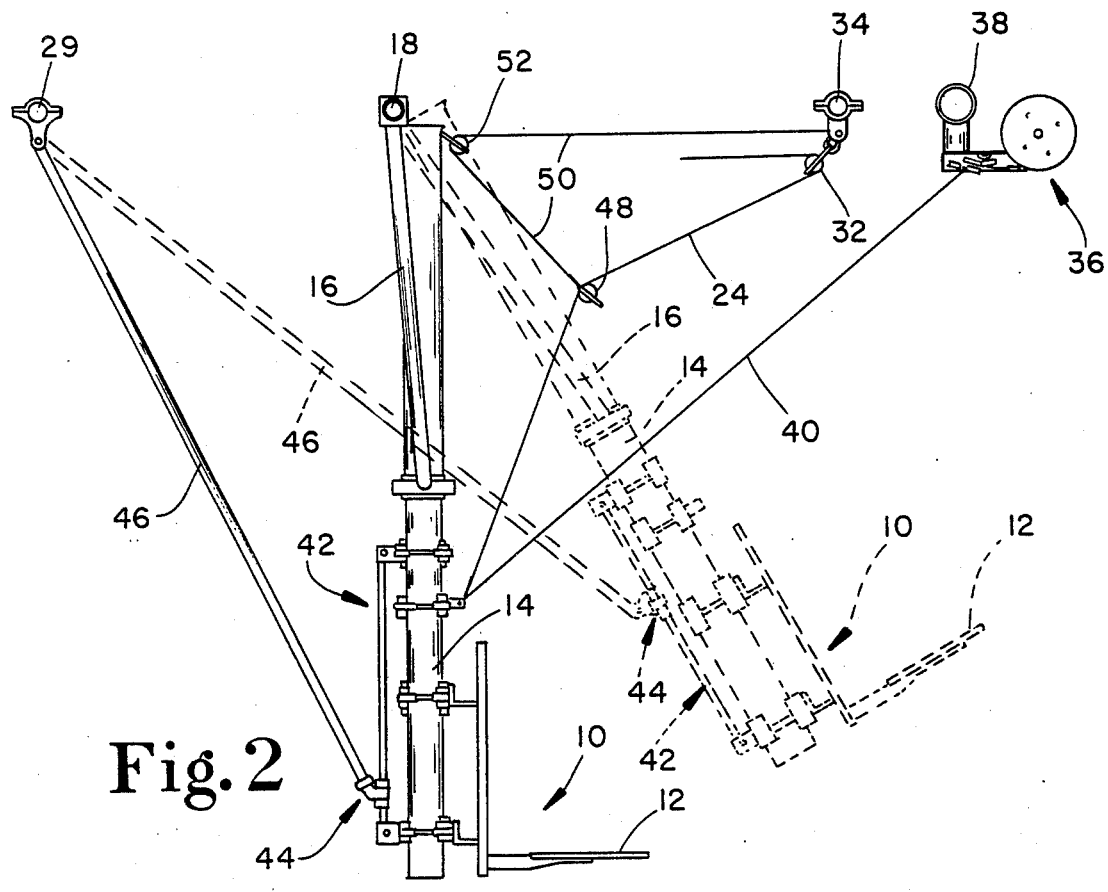
FIG. 2 illustrates a forward-folding basketball backstop including an apparatus constructed according to the present invention.

Referring now particularly to FIGS. 1-2, a baskerball backstop 10 including a baskerball goal ring 12 is shown mounted from a vertical support member or mast 14. A pair of anti-sway side braces 16 extend generally diagonally downward from a horizontal mast support member 18 and are joined to mast 14 above the top of backstop 10.

The backward folding backstop illustrated in FIG. 1 includes a folding brace 20 which is hinged at 22 to allow folding thereof during upward and rearward retraction of mast 14. A hoisting cable 24 is attached to the lower portion 26 of folding brace 20 near its upward end, and is trained about a block 28 provided on mast 14 adjacent its upper end, a block 30 provided on mast 14 adjacent its lower end, and a block 32 suspended from a horizontal support 34. The upper portion 27 of folding brace 20 is pivotally attached to a horizontal support 29.

Hoisting cable 24 extends rearwardly from block 32 to a winch (not shown) which is actuated to fold the backstop and supporting apparatus rearwardly for storage.

The locking apparatus 36 of the instant invention is illustratively suspended from the ceiling on a horizontal support 38 behind support 34 and block 32. The webbing belt 40 of apparatus 36 extends from the apparatus and is illustratively connected to mast 14 adjacent the point at which block 30 is attached to mast 14.

In the forward folding backstop embodiment illustrated in FIG. 2, the mast 14 includes a slide rod 42 which extends longitudinally of the mast 14 on the lower portion thereof. A sliding bushing 44 is mounted on slide rod 42 for reciprocation thereon. A sliding brace 46 is attached at its lower end to bushing 44 and is pivotally attached at its upper end to horizontal supports 29. The hoisting cable 24 in this embodiment is attached to the front of mast 14 above the top of backstop 10 and extends upwardly and forwardly therefrom through an idler pulley 48 to block 32 which is suspended from the ceiling on horizontal support 34 forward of horizontal support 18 which carries mast 14 and anti-sway braces 16. Cable 24 extends rearwardly from block 32 to a winch (not shown) which is energized to fold and unfold the backstops support mechanism. Idler pulley 48 is supported intermediate the forwardly and upwardly extending run of cable 24 by a length of cable 50 which extends over a block 52 which is mounted from the upper end of mast 14. Cable 50 extends forwardly from block 52 and is attached to horizontal support 34.

In this embodiment, the locking apparatus 36 is illustratively mounted from horizontal support 38 which is located in front of horizontal support 34. The belt 40 of apparatus 36 extends rearwardly and downwardly from the apparatus and is attached to the mast 14 adjacent cable 24.

Turning now to FIGS. 3 and 4, the stucture and function of apparatus 36 will be considered in greater detail.

Apparatus 36 includes a supporting framework 54 including a central portion 56, a vertically extending post 58 attached to one end of portion 56 and a spool support arm 60 (FIG. 4) attached to the other end of portion 56 and extending diagonally therefrom. The end of central portion 56 adjacent support arm 60 is formed at 62, 64 to provide arcuate cut-outs. Spool support arm 60 includes an axle 66 at its distal end. Axle 66 rotatably supports a belt storage spool 68 including end plates 70, 72 which extend into close-fitting relationship with cut-outs 62, 64. Spool 68 includes a hollow hub 74 (FIG. 4) upon which belt 40 is wound. A large spring band 76 is attached at one end 78 thereof to the stationary axle 66 which passes through the center of spool 68. The other end 80 of band 76 is attached to the inside surface of hub 74 so that rotation of spool 68 which results from removal of belt 40 therefrom winds spring band 76 to maintain tension on belt 40. Then, as the backstop support apparatus is folded, belt 40 automatically retracts onto spool 68 as the spring 76 unwinds.

Framework 54 includes a pair of cross members 82, 84 which extend between the opposed walls 86, 88 of portion 56 intermediate its ends. Cross member 82 lies generally parallel to a top wall 89 of portion 56. Cross member 84 is located above cross member 82 and is inclined toward cross member 82 at its end adjacent post 58. Cross members 82, 84 provide facing surfaces 90, 92, respectively. A movable jaw or wedge 94 is supported in the framework 54 by pins 96 which extend from two opposite sides of wedge 94 through longitudinally extending slots 100 respectively, in walls 86, 88 of frame portion 56. The engagement of circular cross section pins 96 in elongated slots 100 provides limited longitudinal movement of wedge 94 between surfaces 90, 92.

Belt 40 passes between a surface 104 of wedge 94 and surface 92 of cross member 84. The thick end 106 of wedge 94 includes a pair of longitudinally extending ears 108 which support a circular cross-section pin 112.

A bell crank 114 is pivotally mounted between walls 86, 88. Bell crank 114 includes an arm 116 which extends beneath cross member 82 and is exposed on the bottom side of frame portion 56. Another arm 118 of bell crank 114 includes a slot 120 which extends radially of the axis of bell crank 114. The pin 112 of wedge 94 is positioned in slot 120 for movement between cross members 82, 84 as bell crank 114 pivots on its axis. A spring 122 is wound on bell crank 114. One end of spring 122 is anchored to a post 124 on the inside of wall 88. The other end of spring 122 is wrapped around crank arm 118 so that spring 122 always urges wedge 94 surface 104 into engagement with surface 92 of cross member 84 to prevent movement of belt 40 therebetween.

A drive wheel 126 having a knurled surface is supported for rotation between walls 86, 88 at the end of frame portion 56 adjacent post 58. Belt 40 is trained about drive wheel 126 and passes between it and an idler wheel 128 which is also rotatably supported between walls 86, 88. Movement of belt 40 causes rotation of drive wheel 126 and idler wheel 128. Drive wheel 126 includes an axle extension 130 (FIG. 3) which projects through wall 86. A pair of shafts 132, 134 extend radially from axle extension 130. Shafts 132, 134 reciprocably support weights 136, 138, respectively, intermediate their ends. Weights 136, 138 are positioned on shafts 132, 134 by coil springs 140, 142, respectively, which are captured between weights 136, 138 and the radially outer ends of shafts 132, 134 by pins 144. Each of weights 136, 138 is slotted as at 146 at its radially inner end, and a pin 148 which extends radially outwardly from each of shafts 132, 134 prevents rotation of weights 136, 138 on their shafts 132, 134. Each of weights 136, 138 also carries a trip pin 150. Pins 150 project from the surfaces of weights 136, 138 toward wall 86.

A blocking member 154 is attached to pin 96 of wedge 94 adjacent wall 86. Blocking member 154 is reciprocable with wedge 94 along the outside surface of wall 86. Blocking member 154 includes a blocking surface 156 which is generally perpendicular to the direction of movement of wedge 94 and moves in the direction of movement of wedge 94. A trigger 160 is pivotally mounted at 162 from the outside of wall 86. Trigger 160 includes a surface 164 which abuts surface 156 when trigger 160 is in the position illustrated in FIG. 3 to hold surface 104 of wedge 94 out of engagement with surface 92 of cross member 84 to allow free movement of belt 40 therebetween. A reset spring 166 is mounted on the outside of wall 86 to urge trigger 160 into the orientation illustrated in FIG. 3, and a trigger stop 168 is mounted on the outside of wall 86 to prevent the trigger 160 from going past its position illustrated in FIG. 3 in response to the urging of spring 166.

As belt 40 is drawn from spool 68, drive wheel 126 rotates. The rate at which belt 40 is withdrawn from the spool determines the rate of rotation of wheel 126. If the rotation rate becomes excessive, as will be the case in the event cable 24 fails, weights 136, 138 will be urged radially outwardly against springs 140, 142 due to increasing centrifugal force. The positioning of weights 136, 138 by pins 148 in slots 146 insures trip pins 150 will contact trigger lever 160 when weights 136, 138 reach predetermined positions. At such predetermined positions of weights 136, 138, pins 150 contact trigger 160 causing it to pivot about pin 162 against spring 166. Such movement of trigger 160 moves surface 164 out of blocking engagement with surface 156 and allows wedge 94 to move between members 82, 84. Belt 40 is thereby clamped between surfaces 92, 104 and prevented from further movement until the mechanism is reset. To reset the mechanism, arm 116 of bell crank 114 is urged toward member 82. This action pulls wedge 94 from between members 82, 84 and allows trigger 160 to pivot under the urging of spring 166 such that surface 164 of the trigger is once again placed in blocking engagement with surface 156 of blocking member 154 of the wedge. Trigger 160 is kept from going past this orientation in which it provides blocking engagement for surface 156 by trigger stop 168.

What is claimed is:

1. In combination, a movably mounted backstop and a lock for preventing too-rapid movement of the backstop, the backstop including a flexible safety element, the lock comprising a frame for providing first and second surfaces, a wedge-shaped jaw supported in the frame for movement between the first and second surfaces and into gripping relation with one of said surfaces, the flexible element passing between said one surface and the movable jaw, means including a spring for yieldably urging the movable jaw between the first and second surfaces and into gripping relation with said one surface to prevent movement of the flexible element between said one surface and movable jaw, means for holding the movable jaw against the urging means out of gripping relation with said one surface, and means for actuating the holding means to release the movable jaw for movement into gripping relation with said one surface, the actuating means including means disposed for rotation in response to flexible element movement, means mounted on the rotating means and responsive to rotation thereof to cause the holding means to release the movable jaw when the flexible element moves at a rate in excess of a predetermined rate, a spool for storing the flexible element, the spool being rotatably supported on the frame and spring means for exerting rewinding force on the spool, the spring means being wound by rotation of said spool as the flexible element is withdrawn therefrom, a bell crank for retracting the movable jaw from between the first and second surfaces against the yieldable urging means to reset the holding means, the bell crank being pivotally mounted in the frame and supporting the spring, the spring being wound about the bell crank pivot yieldably to urge the bell crank pivotally in one direction, the bell crank including an arm for coupling the spring force to the movable jaw and a resetting arm, force on the resetting arm urging the bell crank about its pivot in a second and opposite direction to withdraw the movable jaw from between the first and second surfaces.

* * * * *